(12) United States Patent
Tao et al.

(10) Patent No.: US 7,691,163 B2
(45) Date of Patent: Apr. 6, 2010

(54) VEHICLE AIR DRYER

(75) Inventors: Baojian Tao, Ruian (CN); Laicheng Liu, Ruian (CN)

(73) Assignee: SORL Auto Parts, Inc., Ruian, Zhejiang (CN)

( * ) Notice: Subject to any disclaimer, the term of this patent is extended or adjusted under 35 U.S.C. 154(b) by 718 days.

(21) Appl. No.: 11/637,440

(22) Filed: Dec. 12, 2006

(65) Prior Publication Data
US 2007/0157816 A1   Jul. 12, 2007

(30) Foreign Application Priority Data
Dec. 12, 2005   (CN) .................... 2005 2 0142952

(51) Int. Cl.
*B01D 53/02* (2006.01)
(52) U.S. Cl. .................. 55/385.3; 55/DIG. 17; 96/113; 96/134; 96/141; 96/142; 96/144; 34/80
(58) Field of Classification Search ............... 55/385.3, 55/DIG. 17; 95/117, 118, 121, 141, 143, 95/148; 96/10, 113, 134, 135, 141, 142, 96/143, 144, 108; 34/80
See application file for complete search history.

(56) References Cited

U.S. PATENT DOCUMENTS

| | | | |
|---|---|---|---|
| 4,764,189 A * | 8/1988 | Yanagawa et al. ............. 96/114 |
| 4,871,051 A | 10/1989 | Whitmer | |
| 4,955,198 A | 9/1990 | Yanagawa et al. | |
| 5,110,327 A * | 5/1992 | Smith ........................... 96/113 |
| 5,263,403 A | 11/1993 | Choinski et al. | |
| 5,311,809 A | 5/1994 | Choinski et al. | |
| 5,460,076 A | 10/1995 | Peirce et al. | |
| 5,722,311 A | 3/1998 | Pierce et al. | |
| 5,937,733 A | 8/1999 | Stojic | |
| 5,954,176 A | 9/1999 | Ishihara et al. | |
| RE36,955 E | 11/2000 | Pierce et al. | |
| 6,148,711 A | 11/2000 | Stojic | |
| 6,585,806 B2 | 7/2003 | Quinn et al. | |
| 6,730,143 B1 | 5/2004 | Nichols et al. | |
| 6,881,245 B2 | 4/2005 | Nichols et al. | |
| 2004/0074386 A1 * | 4/2004 | Nichols et al. ................. 95/52 |
| 2004/0074721 A1 | 4/2004 | Nichols et al. | |
| 2004/0134344 A1 | 7/2004 | Fisher | |

* cited by examiner

*Primary Examiner*—Duane Smith
*Assistant Examiner*—Tiffany N Palmer
(74) *Attorney, Agent, or Firm*—Morris, Manning & Martin LLP; Tim Tingkang Xia

(57) ABSTRACT

A vehicle air dryer comprising: a dryer cylinder for drying compressed air passing therethrough, an exhaust assembly for providing an additional air outlet, a backflow assembly for providing a backflow air passage, an air pressure governor assembly for maintaining air pressure inside the vehicle air dryer, an one way check valve for providing one way air passage for dried compressed air and preventing air leakage, and a dryer valve body having an air inlet, an air inlet chamber, an air outlet, a slanting air passage leading to the air outlet, a first opening for installing the exhaust assembly, an opposite, second opening for threadingly attaching the dryer cylinder, a third opening, substantially perpendicular to the second opening, for mounting the backflow assembly, and a fourth opening, substantially parallel to the third opening, for receiving the air pressure governor assembly.

7 Claims, 3 Drawing Sheets

VEHICLE AIR DRYER

CROSS-REFERENCE TO RELATED APPLICATION

This application claims priority of Chinese Patent Application No. 200520142952.3, filed on Dec. 12, 2005, entitled "A VEHICLE AIR DRYER" by Baojian TAO, and Laicheng LIU, the disclosure of which is incorporated herein by reference in its entirety.

FIELD OF THE INVENTION

The present invention relates generally to an air brake system, and more particularly, to an air dryer for the air brake system for large vehicles.

BACKGROUND OF THE INVENTION

Large vehicles such as coach buses, tractor trailers, commercial trucks are typically equipped with a compressed air brake system in which the brakes of the vehicle are actuated by compressed air. An air compressor is operated by the vehicle engine and storage reservoirs maintain a quantity of pressurized air for the brakes and other compressed air uses. Moisture, condensed water and oil are problems associated with compressed air systems and are particular problems that can adversely affect brake system operation. Therefore, an air dryer and an oil filter are usually incorporated in the compressed air system. The air dryer is effective at removing moisture, condensed water and oil vapor.

Traditionally, an air dryer has an air dryer valve body, a dryer cylinder, an air pressure governor, a backflow valve. One important function of the air dryer is to connect the air pressure governor and an air outlet through a long and narrow air passage 19' as shown in FIG. 3 of a related art. This long and narrow air passage 19' is very difficult to produce. Often time, the tool used to make such a long and narrow air passage breaks easily. It is for the drill to miss the target during the manufacturing process and causing compressed air leak. Manufacturing cost is driven higher due to the difficulties and higher rejection rate.

Therefore, a heretofore unaddressed need exists in the art to address the aforementioned deficiencies and inadequacies.

SUMMARY OF THE INVENTION

The present invention, in one aspect, relates to a vehicle air dryer. In one embodiment, the vehicle air dryer has: (i) a dryer cylinder with a cylindrical body portion with a closed top end portion and an opposite, open bottom end portion, (ii) an exhaust assembly configured to define an air outlet, (iii) a backflow assembly configured to define a backflow air passage, (iv) an air pressure governor assembly configured to maintain air pressure inside the air dryer, (v) a one way check valve configured to provide one way air passage, and (vi) a dryer valve body. The dryer valve body has an air inlet, an air inlet chamber, an air outlet, a slanting air passage in one way fluid communication with the air outlet through the one way check valve, a first opening portion formed to receive the exhaust assembly, an opposite, second opening portion formed to engage with the open bottom end portion of the dryer cylinder, a third opening portion, formed substantially perpendicular to the second opening portion, configured to engage with the backflow assembly, and a fourth opening portion, formed substantially parallel to the third opening portion, configured to receive the air pressure governor assembly, respectively. The first opening portion, the second opening portion, the third opening portion and the fourth opening portion are configured to be capable of being in fluid communication with each other.

In one embodiment, the dryer cylinder further includes: (i) a ring-shaped air filter adapted for filtering small particles from the air passing therethrough, (ii) a cup-shaped drying agent cartridge with an open top end portion for passing through air to be dried, an open bottom end portion for passing through dried air, and a space defined by the top end portion and bottom end portion filled with drying agent positioned in the center of the dryer cylinder for drying the air passing therethrough, (iii) a circular air passage defined between the outer perimeter of the drying agent cartridge and inner perimeter of the dryer cylinder for passing air from the open bottom end portion of the dryer cylinder to the closed top end portion of the dryer cylinder, and (iv) a dryer chamber adapted for receiving dried air from the drying agent cartridge. When the dryer cylinder is properly installed, the air to be dried passes through the air inlet, the air inlet chamber, the air filter, the circular air passage to the closed to end portion of the dryer cylinder, through the drying agent cartridge to become dried air, and the dried air exits the dryer cylinder through the dryer chamber.

In one embodiment, the backflow assembly has: (i) a throttle in connection to the dryer chamber through the slanting air passage, (ii) a backflow cavity adapted for storing the backflow air from the dryer chamber, (iii) a backflow membrane with a top side and a bottom side, for opening/closing the throttle as the air pressure acting on both sides, (iv) a cavity formed above the backflow membrane, (v) a backflow passage connecting the cavity formed above the backflow membrane to the backflow cavity, and the cavity formed above the backflow membrane to the air outlet, (vi) a backflow valve, and (vii) a backflow air filter. When the backflow assembly is properly installed, when the air pressure inside dryer chamber is high enough to overcome the resilience force of the backflow membrane through the throttle, the air from the dryer chamber enters the cavity formed above the backflow membrane, a portion of the air from the dyer chamber passes through backflow passage to the air outlet through the one way check valve, and another portion of the air from the dryer chamber passes through the backflow passage, the backflow air filter, the backflow valve to the backflow cavity, respectively.

In one embodiment, the air pressure governor assembly includes: (i) an air pressure governing chamber, (ii) an air pressure governor for maintaining a first predetermined air pressure inside vehicle air dryer, (iii) an air pressure governing membrane for separating the air pressure governing chamber and the air pressure governor, (iv) an air pressure governor spring adapted for providing a resilience force to the air pressure governing membrane, (v) an air pressure governing valve for opening/closing an air passage at the action of the air pressure inside the air pressure governing chamber, and (vi) a second air passage connecting the air pressure governing chamber and the cavity above backflow membrane.

In one embodiment, the exhaust assembly includes: (i) an exhaust cavity formed at the first opening portion of the dryer valve body, (ii) an exhaust outlet for providing an exhaust air passage for the vehicle air dryer, (iii) an exhaust valve for controlling air passing through the exhaust outlet, (iv) a first air passage connecting the air pressure governing chamber to the exhaust cavity, and an exhaust piston adapted for opening and closing the exhaust valve at the air pressure inside the exhaust cavity.

When the air pressure governor assembly and the exhaust assembly are properly installed, the air pressure at the air pressure governing chamber reaches a second predetermined pressure level, overcomes the resilience force of air pressure governor spring, opens the air pressure governing valve, and allows air passing through first air passage into exhaust cavity, the air in the exhaust cavity pushes the exhaust piston down to open the exhaust valve, discharging the water condensed from the air in the air inlet and the exhaust valve through the exhaust outlet.

In one embodiment, drying agent in the drying agent cartridge is desiccant material to absorb and adsorb moisture or condensed water. In one embodiment, the one way check valve is positioned between the slanting air passage and the air outlet. The one way check valve provides two air passages: (i) an air passage from the dryer chamber through the slanting air passage to the air outlet, and (ii) a backflow air passage from the cavity above the backflow membrane to the air outlet.

In one embodiment, an air brake system uses a vehicle air dryer. In another embodiment, a vehicle employs the air brake system using the vehicle air dryer.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
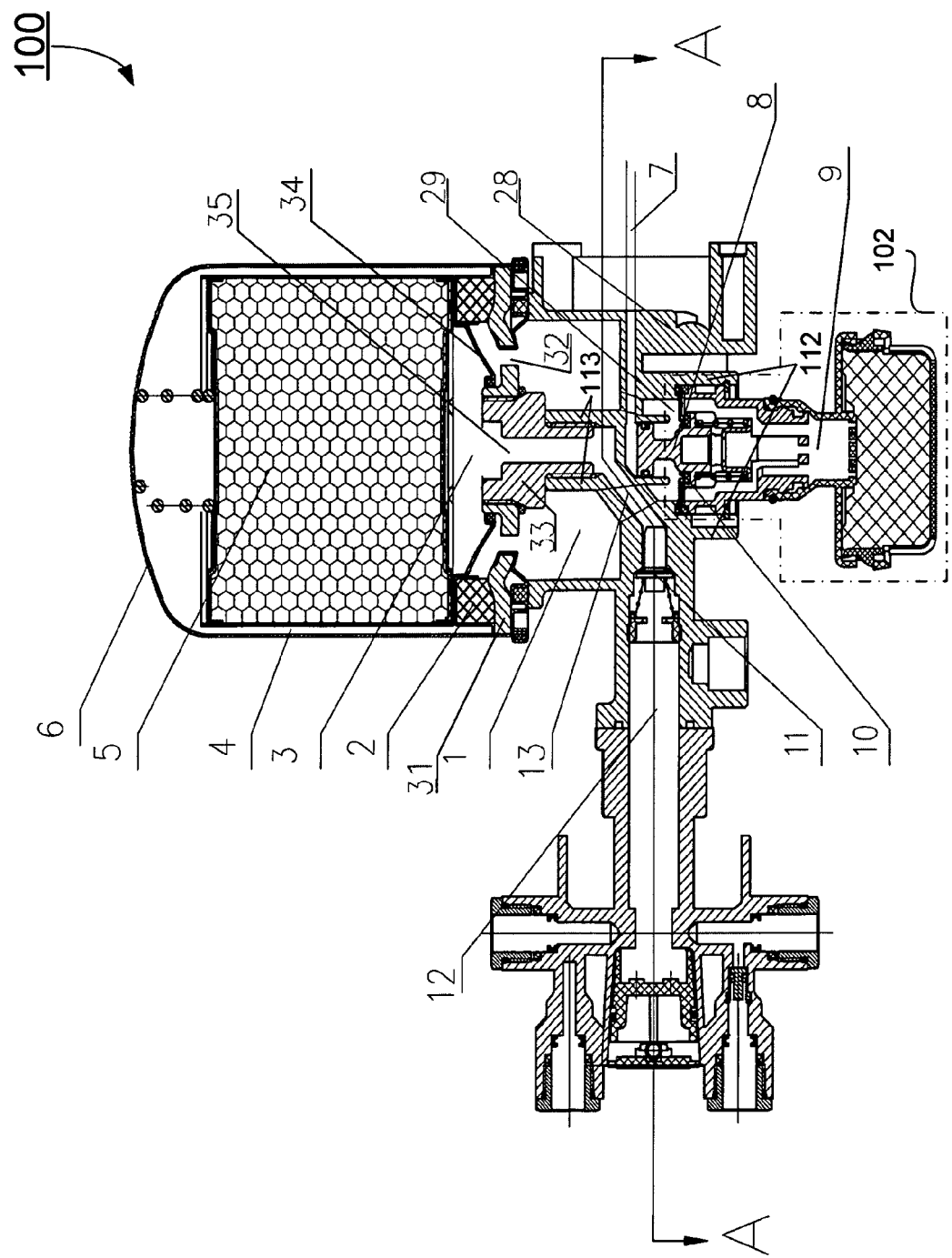
FIG. 1 shows a cross-sectional view of a vehicle air dryer according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

Today, most vehicles that use air brakes are equipped with an air dryer. An air dryer is used to take the moisture out of the air, so that it doesn't take up valuable space in air storage tanks. Air dryers dry and purify the compressed air. The air dryers usually have compact structure and multiple functions. Furthermore, it improves the reliability of the use of other air brake system components, enhancing safe driving.

Figure 2:
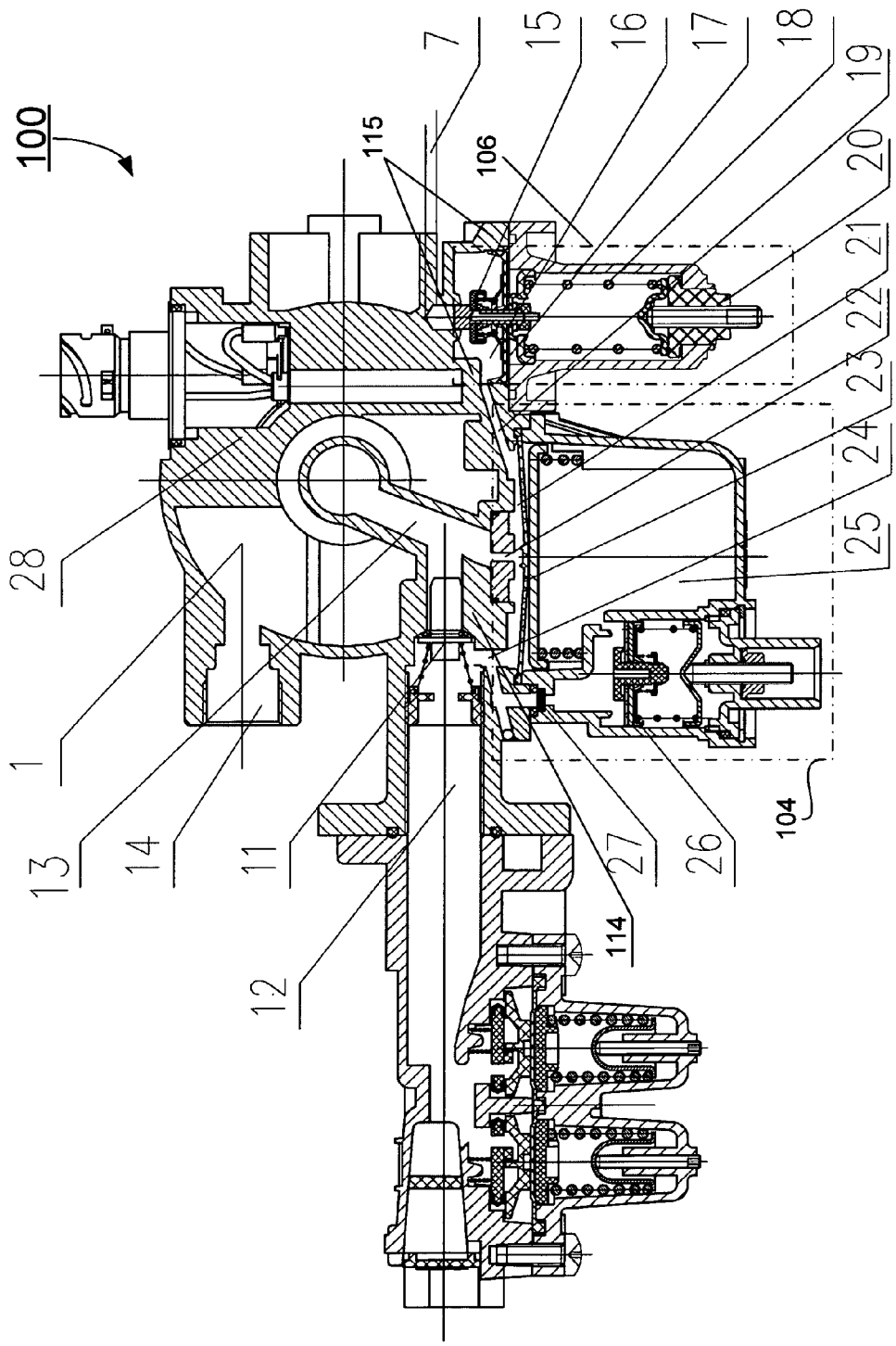
FIG. 2 shows another cross-sectional view of a vehicle air dryer taken along the A-A plane indicated in the FIG. 1 according to one embodiment of the present invention.
Figure 3:
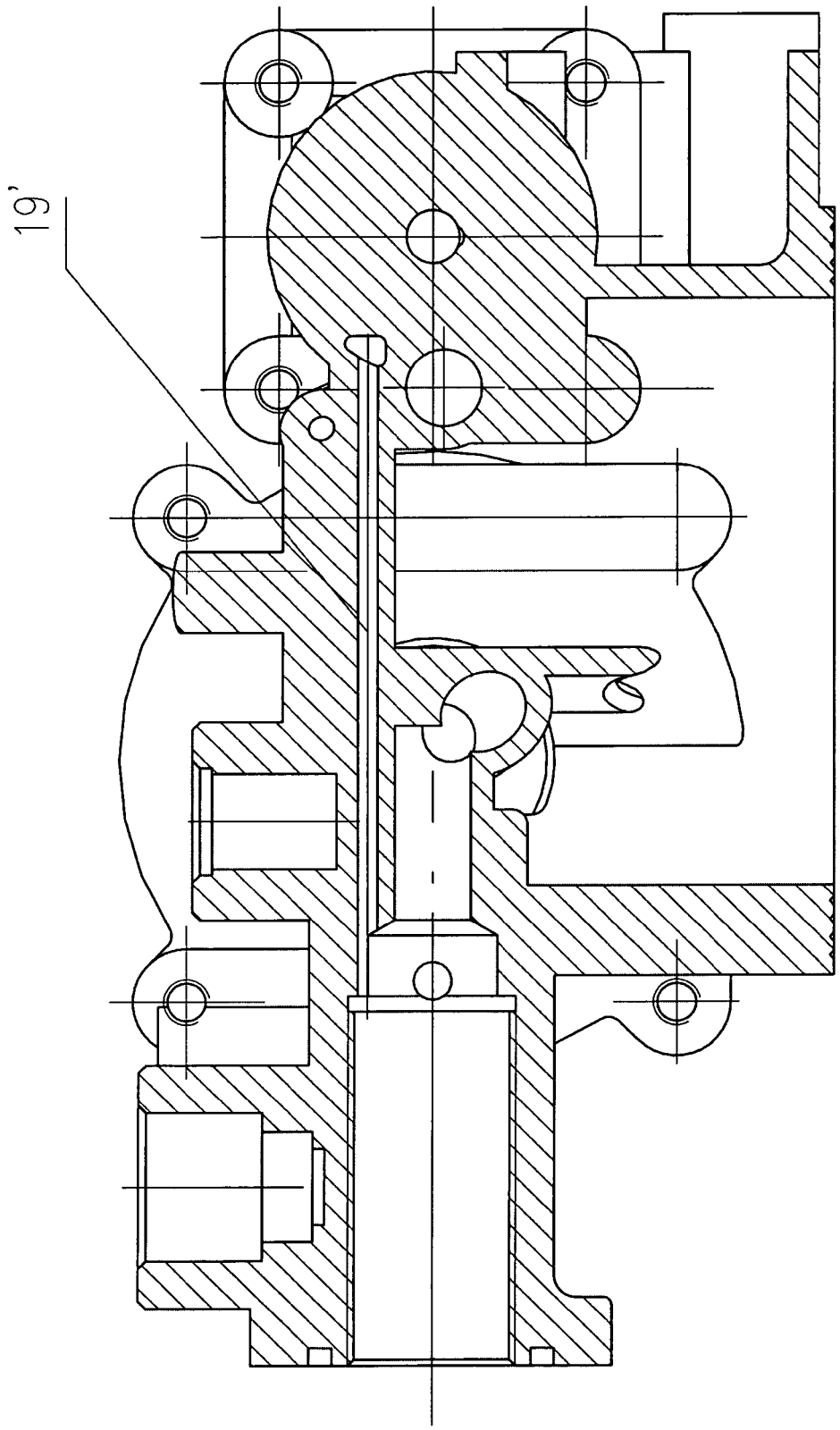
FIG. 3 shows a conventional air dryer valve body with a long narrow air passage according to a related art.

A vehicle air dryer in accordance with the present invention is shown in FIGS. 1 and 2, and is generally designated by reference number 100. Detailed construction of the vehicle air dryer 100 is best described with reference to FIGS. 1 and 2. FIG. 1 shows a cross-sectional view of a vehicle air dryer 100 according to one embodiment of the present invention. FIG. 2 shows another cross-sectional view of the vehicle air dryer 100 taken along the A-A plane indicated in the FIG. 1. According to FIGS. 1 and 2, the vehicle air dryer 100 has following major components:

- a dryer cylinder 6 for drying compressed air passing through;
- an exhaust assembly for providing an additional air outlet;
- a backflow assembly for providing a backflow air passage;
- an air pressure governor assembly for maintaining air pressure inside the vehicle air dryer 100;
- an one way check valve 11 for providing one way air passage for dried compressed air and preventing air leakage; and
- a dryer valve body 28.

The dryer valve body 28 is an essential component where all other components and assemblies are attached. The dryer valve body 28 has

- an air inlet 14;
- an air inlet chamber 1;
- an air outlet 12;
- a slanting air passage 13 leading to the air outlet 12;
- a first opening adapted for installing the exhaust assembly;
- an opposite, second opening adapted for threadingly attaching the dryer cylinder 6;
- a third opening, substantially perpendicular to the second opening, adapted for mounting the backflow assembly; and
- a fourth opening, substantially parallel to the third opening, adapted for receiving the air pressure governor assembly.

The dryer cylinder 6 has a cylindrical body shape, a closed top end and an open bottom end. A bottom cover 31 covering the opened bottom end has a number of ingress openings 32 allowing air to be dried to come in and an egress opening 35 in the center allowing dried air to exit. The air ingress and air egress are separated by a separator 34. Immediately inside of the bottom cover 31, a ring-shaped air filter 2 is installed to filter out small particles from the air ingress. Above the ring shaped filter 2 and the separator 34, a cylinder shaped drying agent cartridge 5 is mounted. The cylinder shaped drying agent cartridge 5 has an opened top end for passing through air to be dried, an opened bottom end for passing through dried air, and a space defined by the top end and bottom end filled with drying agent. The drying agent cartridge 5 is positioned in the center of the dryer cylinder 6 for drying the air passing through. The diameter of the ring shaped air filter 2 and the diameter of the drying agent cartridge 5 are substantially the same, and they are smaller than the inner diameter of the dryer cylinder 6. The space between the outer perimeter of the drying agent cartridge 5 and inner perimeter of the dryer cylinder 6 defines a circular air passage 4 for passing air from the open bottom end of the dryer cylinder 6 to the closed top end of the dryer cylinder 6. At the opened bottom end of the drying agent cartridge 5, a dryer chamber 3 is defined as the air chamber before the air exits the dryer cylinder 6. A mounting member 33 is placed in the center of the bottom cover 31. The mounting member 33 is threaded and is mounted on the second opening of the dryer valve body 28.

When the dryer cylinder 6 is threadingly mounted on the second opening of the dryer valve body 28 through mounting member 33, the air to be dried enters the dryer cylinder 6 through air inlet 14, the air inlet chamber 1, and the number of ingress openings 32. The air passes through the ring-shaped air filter 2 and enters the circular air passage 4 from the bottom end of the dryer cylinder 6 to the closed top end of the dryer cylinder 6. Then the air enters the drying agent cartridge 5 through its opened top end, moisture and water are removed from the air, and the dried air exits the drying agent cartridge 5 through its opened bottom end. The dried air exits the drying agent cartridge through the egress opening of the dryer cylinder 6.

The backflow assembly is installed on the third opening of the dryer valve body 28. The third opening is substantially perpendicular to the first and second openings. The backflow assembly has:

- a throttle 22 in connection to the dryer chamber 3 through the slanting air passage 13;
- a backflow cavity 25 for storing the backflow air from the dryer chamber 3;
- a backflow membrane 23, which has a top side and a bottom side, for opening/closing the throttle 22 at the air pressure acting on both sides;
- a cavity 21 formed above the backflow membrane 23;
- a backflow passage 24, which connects the cavity 21 formed above the backflow membrane 23 to the backflow cavity 25, and also connects the cavity 21 formed above the backflow membrane 23 to the air outlet 12;
- a backflow valve 26; and
- a backflow air filter 27.

When the air pressure inside dryer chamber 3 is high enough to overcome the resilience force of the backflow membrane 23 through the throttle 22, the air from the dryer chamber 3 enters the cavity 21 formed above the backflow membrane 23. A portion of the air from the dyer chamber 3 passes through backflow passage 24 to the air outlet 12 through the one way check valve 11. Another portion of the air from the dryer chamber 3 passes through the backflow passage 24, the backflow air filter 27, and the backflow valve 26 to the backflow cavity 25.

The air pressure governor assembly is positioned at the fourth opening of the dryer valve body 28. The air pressure governor assembly is adapted for maintaining the air pressure inside the vehicle air dryer 100. The air pressure governor assembly comprises:

- an air pressure governing chamber 16;
- an air pressure governor 20 for maintaining certain air pressure inside vehicle air dryer 100;
- an air pressure governing membrane 17 for separating the air pressure governing chamber 16 and the air pressure governor 20;
- an air pressure governor spring 18 for providing a resilience force to the air pressure governing membrane 17;
- an air pressure governing valve 15 for opening/closing an air passage at the action of the air pressure inside the air pressure governing chamber 16; and
- a second air passage 19 connecting the air pressure governing chamber 16 and the cavity above backflow membrane 21.

The exhaust assembly is mounted on first opening of the dryer valve body 28 on the opposite side of the dryer cylinder 6. The exhaust assembly has:

- an exhaust cavity 29 at the first opening of the dryer valve body 28;
- an exhaust outlet 9 for providing an exhaust air passage from the vehicle air dryer;
- an exhaust valve 10 adapted for controlling air passing through the exhaust outlet 9;
- a first air passage 7 connecting the air pressure governing chamber 16 to the exhaust cavity 29; and
- an exhaust piston 8 adapted for opening and closing the exhaust valve 10 at the air pressure inside the exhaust cavity 29.

When the air pressure inside dryer chamber 3 is high enough to overcome the resilience force of the backflow membrane 23 through the throttle 22, the air from the dryer chamber 3 enters the cavity 21 formed above the backflow membrane 23. The second air passage 19 connects the air pressure governing chamber 16 and the cavity 21 formed above the backflow membrane 23. A portion of the air in the cavity 21 formed above the backflow membrane 23 enters the air pressure governing chamber 16. When the air pressure exerted on the air pressure governing membrane 17 exceeds a cut-out pressure, the air overcomes the resilience force of the air pressure governing spring 18, and opens the air pressure governing valve 15. Then the air passes through the first air passage 7 and enters the exhaust cavity 29. The air in the exhaust cavity 29 further pushes the exhaust piston 8 down to open the exhaust valve 10, discharging the water condensed from the air in the air inlet 1 and the exhaust valve 10 through the exhaust outlet 9.

The drying agent in the drying agent cartridge 5 is desiccant materials to absorb and adsorb moisture or condensed water from the air passing through. In one embodiment, the one way check valve 11 is used for providing one way air passage for dried compressed air and preventing air leakage from the air brake system. The one way check valve 11 is positioned between the slanting air passage 13 and the air outlet 12. The one way check valve 11 provides two air passages: (1) an air passage from the dryer chamber 3 through the slanting air passage 13 to the air outlet 12, and (2) a backflow air passage from the cavity 21 formed above the backflow membrane 23 to the air outlet 12.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A vehicle air dryer, comprising:
   - (a) a dryer cylinder, having a cylindrical body portion with a closed top end portion and an opposite, open bottom end portion;
   - (b) an exhaust assembly configured to define an air outlet;
   - (c) a backflow assembly configured to define a backflow air passage;
   - (d) an air pressure governor assembly configured to maintain air pressure inside the air dryer;
   - (e) a one way check valve configured to provide one way air passage; and
   - (f) a dryer valve body having an air inlet, an air inlet chamber, an air outlet, a slanting air passage in one way fluid communication with the air outlet through the one way check valve, a first opening portion formed to receive the exhaust assembly, an opposite, second opening portion formed to engage with the open bottom end portion of the dryer cylinder, a third opening portion, formed substantially perpendicular to the second opening portion, configured to engage with the backflow assembly, and a fourth opening portion, formed substantially parallel to the third opening portion, configured to receive the air pressure governor assembly, respectively, wherein the first opening portion, the second opening portion, the third opening portion and the fourth opening portion are configured to be capable of being in fluid communication with each other, wherein the dryer cylinder further comprises:
(a1) a ring-shaped air filter adapted for filtering small particles from the air passing therethrough;
(a2) a cup-shaped drying agent cartridge having an open top end portion for passing through air to be dried, an open bottom end portion for passing through dried air, and a space defined by the top end portion and bottom end portion filled with drying agent positioned in the center of the dryer cylinder for drying the air passing therethrough;
(a3) a circular air passage defined between the outer perimeter of the drying agent cartridge and inner perimeter of the dryer cylinder, adapted for passing air from the open bottom end portion of the dryer cylinder to the closed top end portion of the dryer cylinder; and
(a4) at a dryer chamber adapted for receiving dried air from the drying agent cartridge, wherein in operation, air to be dried passes through the air inlet, the air inlet chamber, the air filter, the circular air passage to the closed to end portion of the dryer cylinder, through the drying agent cartridge to become dried air, and the dried air exits the dryer cylinder 6 through the dryer chamber, wherein the backflow assembly comprises:
(c1) a throttle in connection to the dryer chamber through the slanting air passage;
(c2) a backflow cavity adapted for storing the backflow air from the dryer chamber;
(c3) a backflow membrane having a top side and a bottom side, adapted for opening/closing the throttle as the air pressure acting on both sides;
(c4) a cavity formed above the backflow membrane;
(c5) a backflow passage connecting the cavity formed above the backflow membrane to the backflow cavity, and the cavity formed above the backflow membrane to the air outlet;
(c6) a backflow valve; and
(c7) a backflow air filter,
wherein in operation, when the air pressure inside dryer chamber is high enough to overcome the resilience force of the backflow membrane through the throttle, the air from the dryer chamber enters the cavity formed above the membrane, a portion of the air from the dryer chamber passes through backflow passage to the air outlet through the one way check valve, and another portion of the air from the dryer chamber passes through the backflow passage, the backflow air filter, the backflow valve to the backflow cavity, respectively.

2. The vehicle air dryer of claim 1, wherein the air pressure governor assembly comprises:
 (a) an air pressure governing chamber;
 (b) an air pressure governor adapted for maintaining a first predetermined air pressure inside vehicle air dryer;
 (c) an air pressure governing membrane adapted for separating the air pressure governing chamber and the air pressure governor;
 (d) an air pressure governor spring adapted for providing a resilience force to the air pressure governing membrane;
 (e) an air pressure governing valve adapted for opening/closing an air passage at the action of the air pressure inside the air pressure governing chamber; and
 (f) a second air passage connecting the air pressure governing chamber and the cavity above backflow membrane.

3. The vehicle air dryer of claim 2, wherein the exhaust assembly comprises:
 a. an exhaust cavity formed at the first opening portion of the dryer valve body;
 b. an exhaust outlet for providing an exhaust air passage for the vehicle air dryer;
 c. an exhaust valve adapted for controlling air passing through the exhaust outlet;
 d. a first air passage connecting the air pressure governing chamber to the exhaust cavity; and
 e. an exhaust piston adapted for opening and closing the exhaust valve at the air pressure inside the exhaust cavity, wherein in operation, when the air pressure at the air pressure governing chamber 16 reaches a second predetermined pressure level, overcomes the resilience force of air pressure governor spring, opens the air pressure governing valve, and allows air passing through first air passage into exhaust cavity, the air in the exhaust cavity pushes the exhaust piston down to open the exhaust valve, discharging the water condensed from the air in the air inlet and the exhaust valve through the exhaust outlet.

4. The vehicle air dryer of claim 3, wherein the drying agent comprises desiccant materials to absorb and adsorb moisture or condensed water.

5. The vehicle air dryer of claim 4, wherein the one way check valve, positioned between the slanting air passage and the air outlet, provides an air passage from the dryer chamber through the slanting air passage to the air outlet, and a backflow air passage from the cavity formed above the backflow membrane to the air outlet.

6. An air brake system using a vehicle air dryer of claim 1.

7. A vehicle using an air brake system of claim 6.

* * * * *